(12) United States Patent
Saine

(10) Patent No.: US 9,671,039 B2
(45) Date of Patent: *Jun. 6, 2017

(54) PNEUMATICALLY ACTUATED LIQUID DISPENSING VALVE

(71) Applicant: Nordson Corporation, Westlake, OH (US)

(72) Inventor: Joel E. Saine, Dahlonega, GA (US)

(73) Assignee: NORDSON CORPORATION, Westlake, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/456,539

(22) Filed: Aug. 11, 2014

(65) Prior Publication Data

US 2014/0361203 A1  Dec. 11, 2014

Related U.S. Application Data

(63) Continuation of application No. 13/390,628, filed as application No. PCT/US2010/049634 on Sep. 21, 2010, now Pat. No. 8,800,957.

(Continued)

(51) Int. Cl.
*F16K 31/00* (2006.01)
*F16K 31/40* (2006.01)
(Continued)

(52) U.S. Cl.
CPC ............ *F16K 31/40* (2013.01); *B05C 5/0237* (2013.01); *F16K 31/128* (2013.01);
(Continued)

(58) Field of Classification Search
CPC .. F16K 31/40; F16K 31/1245; F16K 31/1221; F16K 31/128; B05C 5/0237; B05B 1/3013
(Continued)

(56) References Cited

U.S. PATENT DOCUMENTS 764,629 A  7/1904  Powers
2,650,609 A  9/1953  Herbst
(Continued)

FOREIGN PATENT DOCUMENTS

CN  2530257 Y  1/2003
CN  1424943 A  6/2003
(Continued)

OTHER PUBLICATIONS

Japanese Patent Office, Japanese Office Action in Application No. 2012-530972, issued Jun. 3, 2014, 14 pages.
(Continued)

*Primary Examiner* — Umashankar Venkatesan
(74) *Attorney, Agent, or Firm* — Baker & Hostetler LLP

(57) ABSTRACT

A liquid dispensing valve includes a liquid inlet for receiving the liquid and a liquid outlet for discharging the liquid. A valve member is mounted for movement relative to the liquid outlet between open and closed positions. A liquid passage communicates between the liquid inlet and the liquid outlet. An air inlet is provided for receiving air from a source of pressurized air. An air passageway is coupled with the air inlet. A pneumatic actuator communicates with the air passageway for moving the valve member at least to the open position. An electrically operated air supply device interacts with the air passageway so as to control the flow of pressurized air to the pneumatic actuator.

40 Claims, 12 Drawing Sheets

Related U.S. Application Data

(60) Provisional application No. 61/244,289, filed on Sep. 21, 2009.

(51) Int. Cl.
| | |
|---|---|
| *F16K 31/122* | (2006.01) |
| *F16K 31/124* | (2006.01) |
| *F16K 31/128* | (2006.01) |
| *B05C 5/02* | (2006.01) |
| *B05B 1/30* | (2006.01) |

(52) U.S. Cl.
CPC ...... *F16K 31/1221* (2013.01); *F16K 31/1245* (2013.01); *B05B 1/3013* (2013.01)

(58) Field of Classification Search
USPC ........ 91/416, 459, 417 R; 251/25, 30.01, 63, 251/63.5
See application file for complete search history.

(56) References Cited

U.S. PATENT DOCUMENTS

| | | | |
|---|---|---|---|
| 2,770,441 A | 11/1956 | Grove | |
| 3,143,131 A | 8/1964 | Spencer | |
| 3,266,520 A | 8/1966 | McGuire et al. | |
| 3,420,208 A | 1/1969 | Guthrie | |
| 3,603,348 A | 9/1971 | Wright | |
| 3,815,788 A | 6/1974 | Reighard et al. | |
| 4,318,333 A | 3/1982 | Cemenska | |
| 4,338,965 A | 7/1982 | Garnjost et al. | |
| 4,886,013 A | 12/1989 | Turner et al. | |
| 5,375,738 A | 12/1994 | Walsh et al. | |
| 5,467,899 A * | 11/1995 | Miller ................. | B05C 11/1034 222/309 |
| 5,656,135 A | 8/1997 | Baker | |
| 5,894,860 A | 4/1999 | Baldauf et al. | |
| 6,056,155 A * | 5/2000 | Byerly ................. | B05C 5/0225 222/1 |
| 6,164,568 A * | 12/2000 | Muller ................. | B05C 5/0237 239/584 |
| 6,371,337 B2 | 4/2002 | Garcia et al. | |
| 6,499,629 B1 | 12/2002 | Colangelo et al. | |
| 6,669,057 B2 * | 12/2003 | Saidman ................. | B05C 5/001 222/146.5 |
| 7,025,081 B2 | 4/2006 | Colangelo et al. | |
| 7,823,752 B2 | 11/2010 | Riney | |
| 8,104,649 B2 | 1/2012 | Riney | |
| 2003/0080153 A1 | 5/2003 | Saidman et al. | |
| 2004/0011817 A1 | 1/2004 | Colangelo et al. | |
| 2005/0236438 A1 | 10/2005 | Chastine et al. | |
| 2006/0097010 A1 * | 5/2006 | Riney ..................... | B05C 5/001 222/146.5 |
| 2008/0006658 A1 | 1/2008 | Bolyard | |
| 2008/0061080 A1 | 3/2008 | Riney | |
| 2009/0026230 A1 | 1/2009 | Robinson et al. | |
| 2009/0266844 A1 | 10/2009 | McGuffey | |

FOREIGN PATENT DOCUMENTS

| | | |
|---|---|---|
| DE | 202005000656 U1 | 4/2005 |
| EP | 1226876 A1 | 7/2002 |
| EP | 1308217 A2 | 5/2003 |
| GB | 993620 A | 6/1965 |
| JP | S62-077379 U | 5/1987 |
| JP | S62-292973 A | 12/1987 |
| JP | 04-068271 U | 6/1992 |
| JP | H08-219321 A | 8/1996 |
| JP | 2004-156762 A | 6/2004 |
| JP | 2006-308105 A | 11/2006 |
| JP | 2008-020069 A | 1/2008 |
| WO | 2011092164 A1 | 8/2011 |

OTHER PUBLICATIONS

European Patent Office, European Search Report in Application No. 10818017.5-1757, issued Jun. 30, 2015, 7 pages.
Nordson EFD LLC, BackPack(TM) Valve Actuator, Operating Manual, 2010.
Baumer HHS GMBH, Xmelt(R) HP-500, Brochure, undated.
Chinese Patent Office, Chinese Office Action in Application No. 2005101184732, issued Sep. 28, 2007, 12 pages.
U.S. Patent and Trademark Office, International Search Report and Written Opinion in PCT Application No. PCT/US10/049634, Nov. 4, 2010.
U.S. Patent and Trademark Office, International Preliminary Report on Patentability in PCT Application No. PCT/US10/049634, Nov. 30, 2011.
Chinese Patent Office, Chinese Office Action in Application No. 201080041996.0, Sep. 29, 2013.
Chinese Patent Office, Second Office Action in Chinese Application No. 201080041996.0, May 21, 2014.

* cited by examiner

PNEUMATICALLY ACTUATED LIQUID DISPENSING VALVE

CROSS-REFERENCE TO RELATED APPLICATIONS

This application is a continuation application of U.S. patent application Ser. No. 13/390,628, filed Feb. 15, 2012, which is a U.S. National Phase Application under 35 U.S.C. §371 of PCT/US10/049634, filed Sep. 21, 2010 which claims the priority of U.S. Provisional Patent Application Ser. No. 61/244,289, filed on Sep. 21, 2009, the disclosures of which are incorporated by reference herein.

BACKGROUND

The invention generally relates to pneumatically actuated liquid dispensing valves, such as those designed to dispense liquid hot melt adhesives. With increasing manufacturing line speeds it is important to improve the performance of these valves with respect to their ability to actuate quickly between on and off conditions. Traditionally, the fastest acting dispensing valves have been the more expensive electric guns.

Because air is a compressible fluid the actuating air volume in the actuation portion of the valve, and the actuation components coupled with the valve, plays a role in establishing the rate at which the dispensing valve may be switched between on and off conditions. An air supply device, such as an electrically operated solenoid valve, has been used to supply and switch the actuating air. When the solenoid is electrically activated to supply pressurized air to the liquid dispensing valve, the pressurized air acts against an actuator, such as a movable piston or diaphragm. This opens the liquid dispensing valve. The solenoid valve may be deactivated to then shut off or switch the pressurized air and allow a spring and/or pressurized air to close the liquid dispensing valve. The air volume in the outlet of the solenoid, the porting between the solenoid valve and the pneumatic actuator, and the air pathways and actuation portion of the dispensing valve itself, can provide an undesirable delay during the opening and closing of the valve due to the compressible nature of air.

SUMMARY

Generally, the invention provides a liquid dispensing valve including a liquid inlet for receiving the liquid and a liquid outlet for discharging the liquid. A valve member is mounted for movement relative to the liquid outlet between open and closed positions. A liquid passage communicates between the liquid inlet and the liquid outlet. An air inlet is provided for receiving air from a source of pressurized air. An air passageway is coupled with the air inlet. A pneumatic actuator communicates with the air passageway for moving the valve member at least to the open position. An electrically operated air supply device interacts with the air passageway so as to control the flow of pressurized air to the pneumatic actuator. The air passageway is located in the liquid dispensing valve and not, for example, in a separate solenoid body or associated structure outside of the liquid dispensing valve. Incorporating an electrically operated air supply device in this manner reduces overall air volume used for actuating the liquid dispensing valve and improves response time.

An air actuation portion of the liquid dispensing valve can carry the pneumatic actuator and the air inlet is located in the air actuation portion. The air actuation portion may be formed from a thermally insulating, nonmetallic material so as to reduce heat transfer from the heated liquid to the electrically operated air supply device. The air supply device may further comprise a movable element engageable with the actuation portion and movable with respect to the air passageway to selectively allow and prevent flow of the pressurized air to operate the pneumatic actuator. The air supply device may further comprise an electrically operated solenoid including the movable element. Alternatively, or in addition, a thermal insulating member may be provided to insulate or isolate the solenoid from the liquid. The solenoid may further comprise a solenoid valve, which includes cooperating valve components to control the flow path of actuation air used to operate the valve member of the liquid dispensing valve. The actuation portion may further comprise a housing and the air supply device may be mounted to the housing. The movable element may extend from outside the housing at least partially into the housing. A valve seat may be disposed in fluid communication with the air passageway, and the movable element may selectively engage with the valve seat to control the flow of air through the air passageway to the pneumatic actuator.

In another embodiment, the liquid dispensing valve comprises an air-over-air type of pneumatic actuator. Specifically, a first air passageway supplies pressurized air to the pneumatic actuator to move the valve member to the closed position. A second air passageway supplies pressurized air to the pneumatic actuator to move the valve member to the open position. The movable element may further include an air connection passage. The air connection passage communicates with the first air supply passage when the movable element is in a first position, and opens the second air supply passage when the movable element is in a second position.

In another embodiment, the air supply device further comprises a housing containing first and second spools each mounted for reciprocating movement in the housing. The air supply device further comprises a movable element for controlling pressurized air flow to the spools, and the pressurized air reciprocates the spools between first and second positions. The first position directs pressurized air to the pneumatic actuator to move the valve member to the open position and the second position directs pressurized air to the pneumatic actuator to move the valve member to the open position. The air supply device can further comprise an electrically operated solenoid having the movable element and the spools can further comprise pneumatic pistons. The movable element selectively controls pressurized air delivery to the pneumatic pistons. Alternatively, the movable element is physically connected to at least one spool configured to control flow of the pressurized air to the pneumatic actuator. In either case, the movable element of the electrically operated air supply device, e.g., a solenoid, is operatively connected to at least one spool valve.

The liquid inlet and the liquid outlet may be located in a liquid dispensing portion of the liquid dispensing valve and the air supply device may be thermally insulated from the liquid dispensing portion. More specifically, the electromagnetic coil of the solenoid may be thermally insulated from the heated portion or portions of the liquid dispensing valve, such as the liquid dispensing portion, and including the heated liquid itself. This can increase the service life of the solenoid and/or eliminate the need for using highly temperature resistant solenoids. The thermal insulation may be accomplished in various manners such as through the use of a thermal insulation member generally between the solenoid coil and the heated liquid, and/or the use of a thermally insulating air actuation housing.

In another embodiment, the air supply device further comprises an electrically operated solenoid valve. The electrically operated solenoid valve includes at least one air valve component operative to selectively control introduction of the positively pressurized air to the air. The solenoid valve may further comprise cooperating or interacting valve components. The solenoid valve may be configured as a self-contained or unitary electrically operated solenoid valve such as a cartridge-style solenoid valve. The solenoid valve may be inserted into and fixed a bore or other receiving area within the actuation portion of the liquid dispensing valve. The outlet(s) of the solenoid valve are in close proximity to the pneumatic actuator, such as in close proximity to the piston chamber of a pneumatic piston actuator. As a further aspect, the electrically operated solenoid valve may include an air outlet positioned in a housing associated with the actuation portion of the liquid dispensing valve. The air outlet of the solenoid valve communicates with the air passageway and pneumatic actuator of the liquid dispensing valve and is proximate the pneumatic actuator.

In another embodiment, a liquid dispensing valve is provided and includes a liquid dispensing portion with an inlet for receiving the liquid and an outlet for discharging the liquid. A valve member is mounted for movement relative to said outlet between open and closed positions, and a liquid passage communicates between said inlet and said outlet. The liquid dispensing valve further comprises an actuation portion with an air passageway and containing a pneumatic actuator operated by positively pressurized air flowing within said air passageway to move said valve member at least to the open position. The actuation portion includes a housing formed from a thermally insulating, nonmetallic material and containing said pneumatic actuator. An electrically operated solenoid is coupled to said housing and operates to selectively control introduction of the positively pressurized air to the air passageway.

In each of the embodiments described herein, the housing of the actuation portion may comprise a thermally insulating, nonmetallic material. Also, although other types of movements are possible depending on the design of the valve, the respective movements of the valve member, the movable element and/or the air poppet(s) or spool(s) are preferably reciprocating movements. These components may be designed to have other types of operating movement, such as pivoting or rotational movements.

Various other features, details and advantages of the invention will become more readily apparent to those of ordinary skill in the art upon review of the following detailed description of the illustrative embodiments, taken in conjunction with the accompanying drawings.

DETAILED DESCRIPTION OF THE ILLUSTRATIVE EMBODIMENTS

Figure 1:
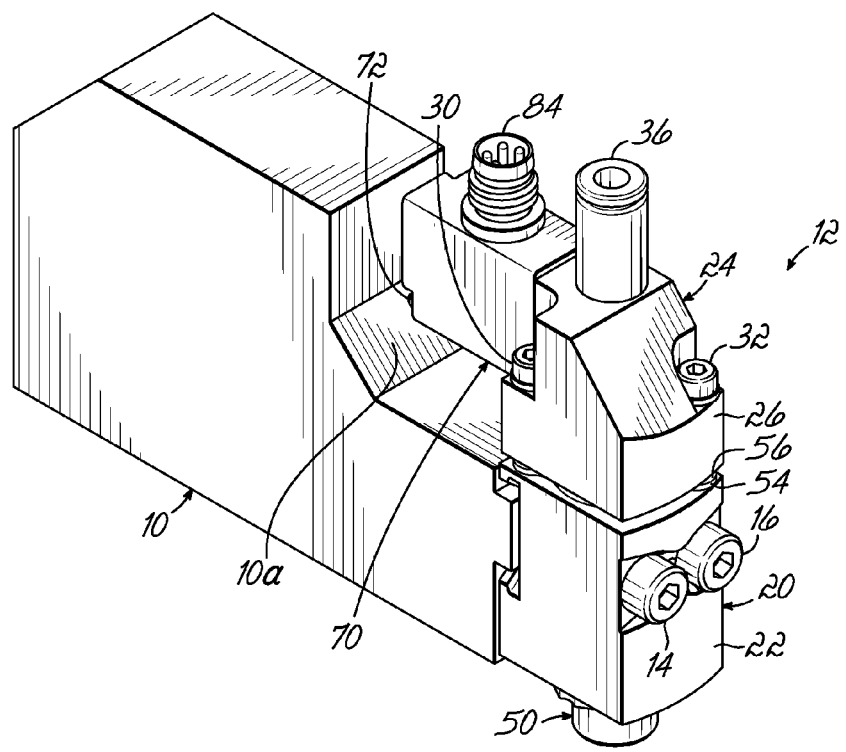
FIG. 1 is a perspective view of a first illustrative embodiment of the invention showing an assembly including an air/adhesive manifold and a liquid dispensing valve.
Figure 2:
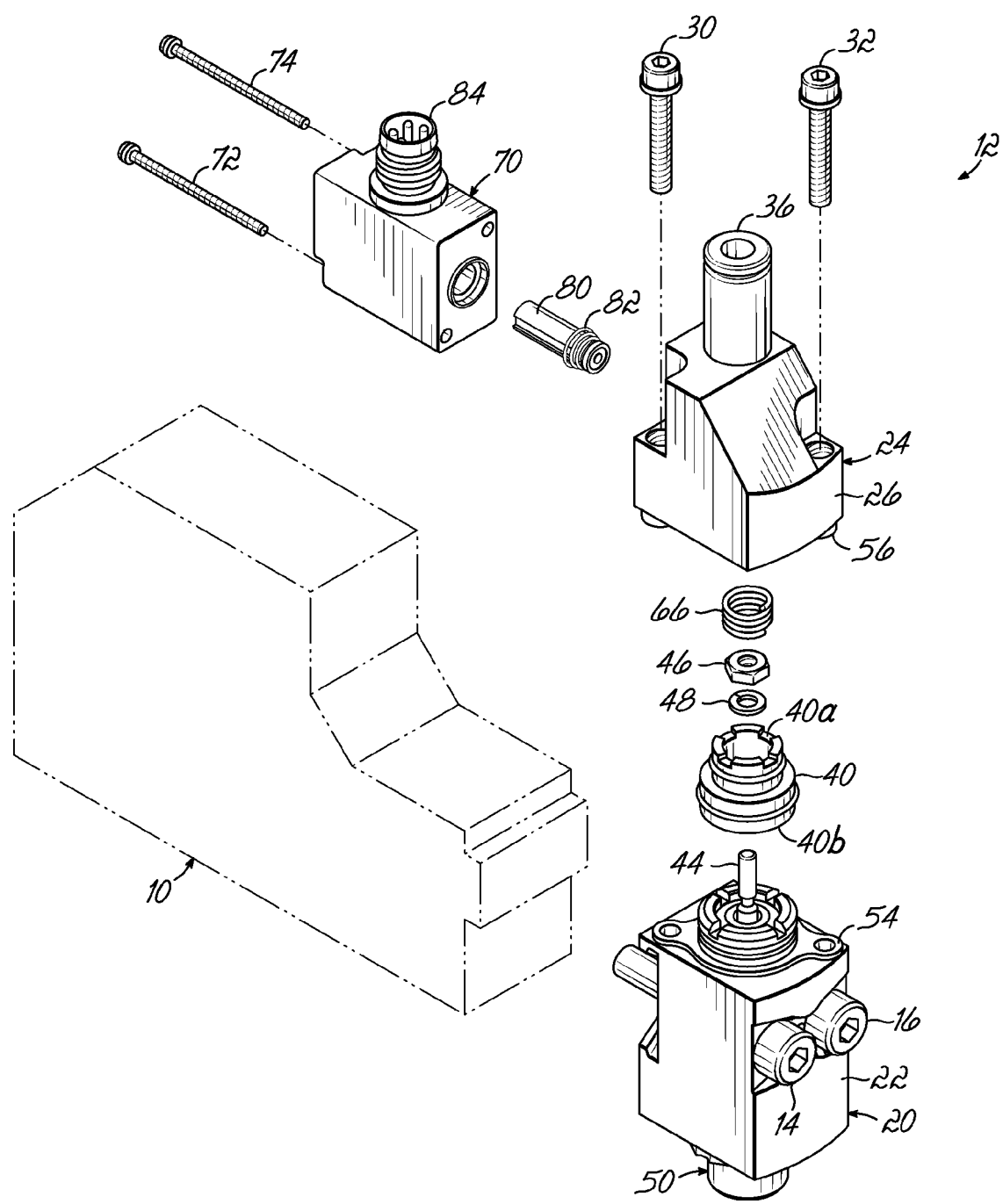
FIG. 2 is an exploded perspective view of the assembly shown in FIG. 1.

Referring to FIGS. 1 and 2, a first embodiment, shown for illustrative purposes, includes a manifold or service block 10 that may be heated and used to supply liquid hot melt adhesive and, optionally, process or pattern air to an attached liquid dispensing valve 12. It will be appreciated that the valve 12 and manifold or service block may be integrated together or coupled in any desired manner. Although the valve 12 shown herein is not process air-assisted, process or pattern air may be used to impart a number of patterns such as, for example, a swirl motion, to the discharged or extruded adhesive, and this may be accomplished in various known manners. The liquid dispensing valve 12 is attached to the manifold 10, for example, by two fasteners 14, 16. The liquid dispensing valve 12 may further comprise a lower liquid dispensing portion 20 including a valve body 22 and an upper actuation portion 24 including a housing or cap 26. The liquid dispensing portion 20 in the various embodiments will typically be heated in a suitable manner to an application temperature suitable for dispensing hot melt adhesive. The housing or cap 26 is coupled to the valve body 22 by two fasteners 30, 32. The housing or cap 26 includes a pressurized air inlet fitting 36 for receiving air into an internal passage 36a. The air may be at conventional "shop" air pressures, for example, of approximately 80 psi. The cap or housing 26 may be formed from a thermally insulating material, such as plastic or ceramic or another nonmetallic insulating material (e.g., PPS). The term "nonmetallic" as used herein is meant to encompass materials having no metal whatsoever, for example, plastics or the like or composites that may have small amounts of metal such as fibers, for example, to add strength but that comprise primarily non-metal material. In this latter case, the thermal conductivity of the thermally insulating housing will be less than that which would exist if the housing was made entirely or primarily from the metal. The liquid dispensing valve 12 further includes a pneumatic actuator, such as a differential piston 40 affixed to a valve member. In this embodiment, the valve member is a valve stem 44 mounted for movement within the valve body 22. A lock nut 46 and lock washer 48 are used to secure the differential piston 40 to the valve stem 44. As further shown in FIGS. 3 and 4, the valve stem 44 is guided for movement against a valve seat 45 by a guide 47 secured within the valve body 22.

The valve body 22 is preferably formed from a heat conducting material, such as aluminum. A dispensing nozzle 50 is coupled to the valve body 22. A coil spring 66 provides a closing function for the valve stem 44. An electrically operated air supply device, such as a solenoid 70, is coupled to the upper housing or cap 26. This can be accomplished, for example, by two fasteners 72, 74. As used herein, the term "solenoid" generally refers to an electromagnetic coil in combination with a movable element, often referred to as an armature. When the coil is energized, the movable element or armature moves from a first position to a second position. The movable element may or may not have valve components associated with it and, if this is the case, the solenoid may be referred to more specifically as a solenoid valve. As further described below, the solenoid 70 includes a movable element or poppet 80 that may be quickly actuated between two positions by way of an electromagnetic coil 71 contained within the electrically-operated solenoid 70 and a coil spring 82. The coil spring 82 holds the poppet 80 in a normally extended position (FIG. 3), while the electromagnetic coil 71 will draw the poppet 80 to a retracted position (FIG. 4) when activated. The solenoid 70 includes a connector 84 for receiving a suitable electrical cable (not shown). The solenoid 70 may be located in any suitable orientation and location. For example, as shown in FIG. 1, the solenoid 70 may be located in a recess 10a of the manifold 10. Other possibilities include incorporating at least the internal components of the solenoid 70 within the manifold 10 or within the cap or housing 26. It will be appreciated that the valve body 22 is heated through conduction by the heated manifold 10 when dispensing thermoplastic liquid such as hot melt adhesive, and from the heat of the liquid itself. It is preferable that heat transfer from the valve body 22 to the solenoid 70 be reduced. An upper surface 54 of the body 22 can include a standoff portion (or a separate standoff element may be used) which spaces the valve body 22 from the upper housing or cap 26 and thereby limits heat transfer between the valve body 22 and the housing 26 which in turn helps to thermally insulate the solenoid 70. The housing 26 may have a similar standoff 56 (FIG. 3).

Figure 3:
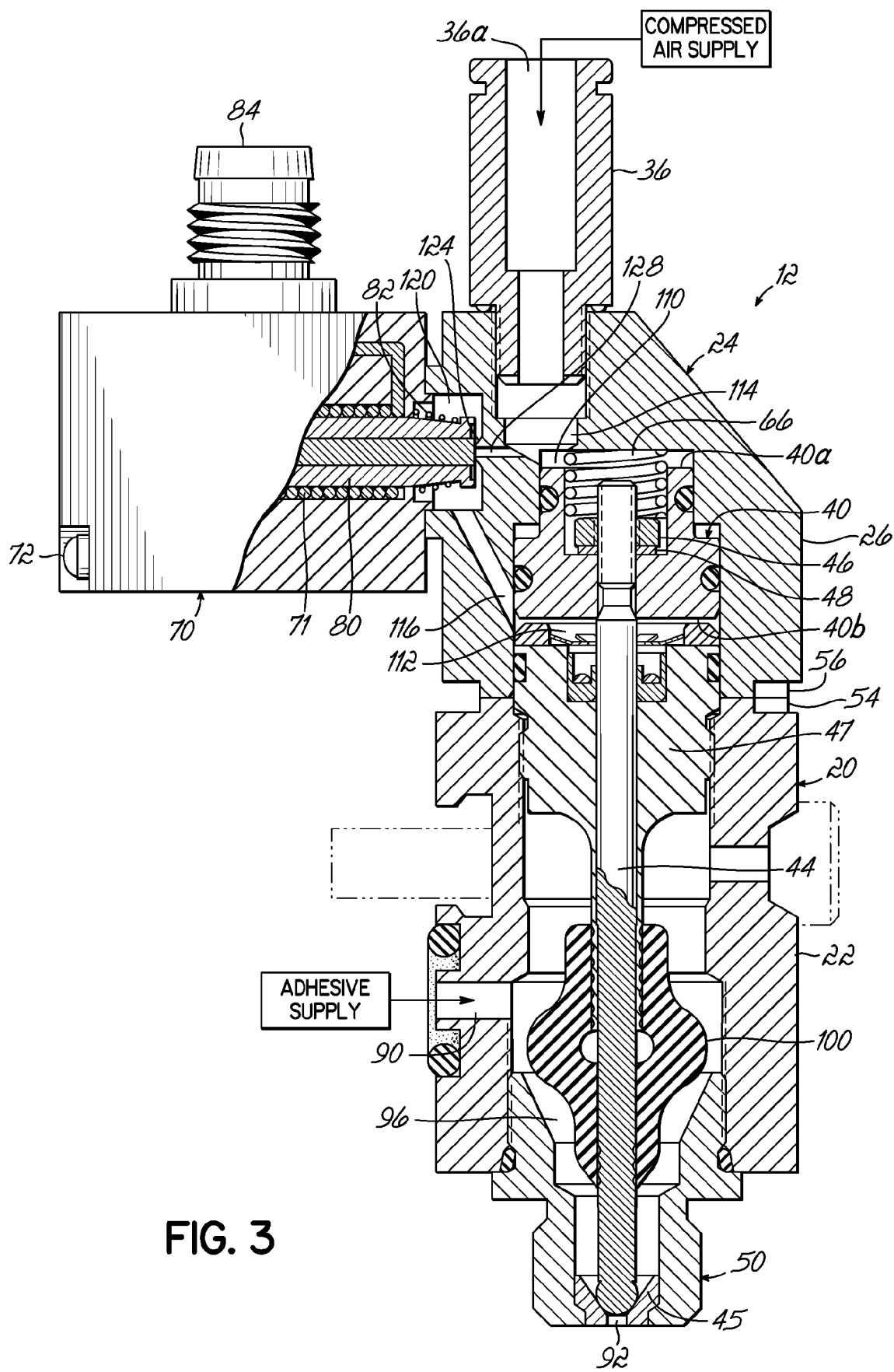
FIG. 3 is a cross sectional view taken longitudinally along the liquid dispensing valve of FIG. 1 and showing the valve in a closed position.
Figure 4:
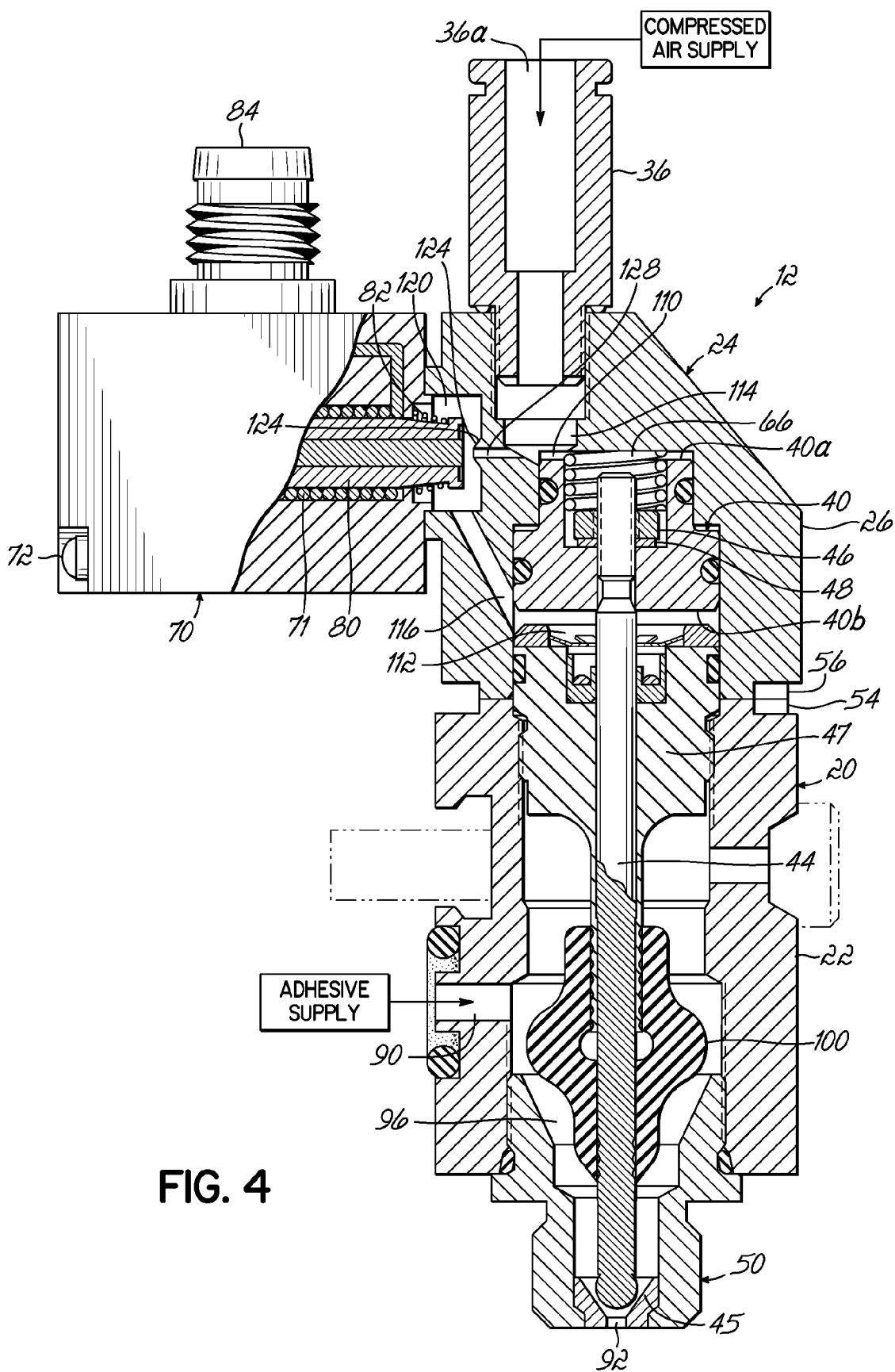
FIG. 4 is a cross sectional view similar to FIG. 3, but illustrating the valve in an open position.

Referring now to FIGS. 3 and 4, in the illustrative embodiment shown, the valve body 22 includes a liquid inlet 90 and a nozzle receiving portion 50 with a liquid outlet 92, and a liquid passage 96 communicating therebetween. The valve stem 44 is mounted for movement within the passage 96 to open the valve 12 (FIG. 4) and close the valve 12 (FIG. 3). An elastomeric seal member 100 can be used to seal the liquid portion 20 of the valve 12 from the air actuation portion 24 of the valve 12. This lower seal portion of the valve 12 may be designed, e.g., according to U.S. Patent Publication No. 2006/0097015, the disclosure of which is incorporated by reference herein. Other embodiments may use any number of different designs, such as those sold under the model designations of H200 and Classic Blue by Nordson Corp. of Westlake, Ohio. The seal member 100 includes a bulbous central section which is arch-shaped in cross-section on each of two opposite sides, as shown, and has a single convolution in the central section tapering in thickness toward opposite ends of the seal member 100. The actuation portion 24 of the valve 12 includes a pneumatic actuator, such as in the form of the differential piston 40 having first and second sides 40a, 40b of differing diameter and surface area within respective pressurized air chamber portions 110, 112. The upper chamber portion 110 communicates with an inlet air passage 114 of the valve 12, which communicates with passage 36a of the fitting, and the lower chamber portion 112 communicates with a passage or passageway 116 in the valve 12. The solenoid 70 is preferably mounted between these two passages 114, 116 with the movable element or poppet 80 thereof extending within another passage 120 and movable with respect to a valve seat 124. Poppet 80 therefore interacts at least with passageways 120 and 128 of the valve 12. When the movable element or poppet 80 is in its extended position (FIG. 3) engaged with the valve seat 124, a communication passage 128 is blocked between the respective passages 114 and 116, 120 as shown in FIG. 3. Therefore, pressurized air is then only supplied to the upper chamber portion 110 to provide an air-assisted valve closing function which, together with the force of the coil spring 66, closes the valve member or stem 44. As shown in FIG. 4, when the movable element or poppet 80 is actuated and moves to its retracted position within the solenoid 70 due to energization of the electromagnetic coil 71, pressurized air will be directed through the communication passage 128 to the passage 116 and lower chamber portion 112. Due to the larger surface area of the differential piston 40 on the lower side 40b, the force pushing the piston 40 upward will be greater than the total force tending to push the piston 40 downward (i.e., the air pressure against the smaller upper surface 40a together with the force of the coil spring 66). Therefore, the valve stem 44 will move upward into the open position shown in FIG. 4. Because the movable element or poppet 80 extends at least partially within the air actuation portion 24, this provides a further reduction in total pressurized air volume and thereby improves actuation speed and performance. Generally stated, the solenoid 70 opens and closes a bypass channel formed by passages 116 and 128. This bypass channel 116, 128 should be as short as possible. The valve seat 124 should be located in a manner designed to reduce the length of the bypass channel 116, 128. Therefore, the valve seat 124 is preferably located within the air actuation portion 24. However, the valve seat 124 may optionally be located at the outer surface of the cap 26 rather than internally, as shown. In either case, in this embodiment the movable element 80 is engageable with a portion of the valve or module 12, as opposed to being part of a self-contained solenoid valve.

Figure 5:
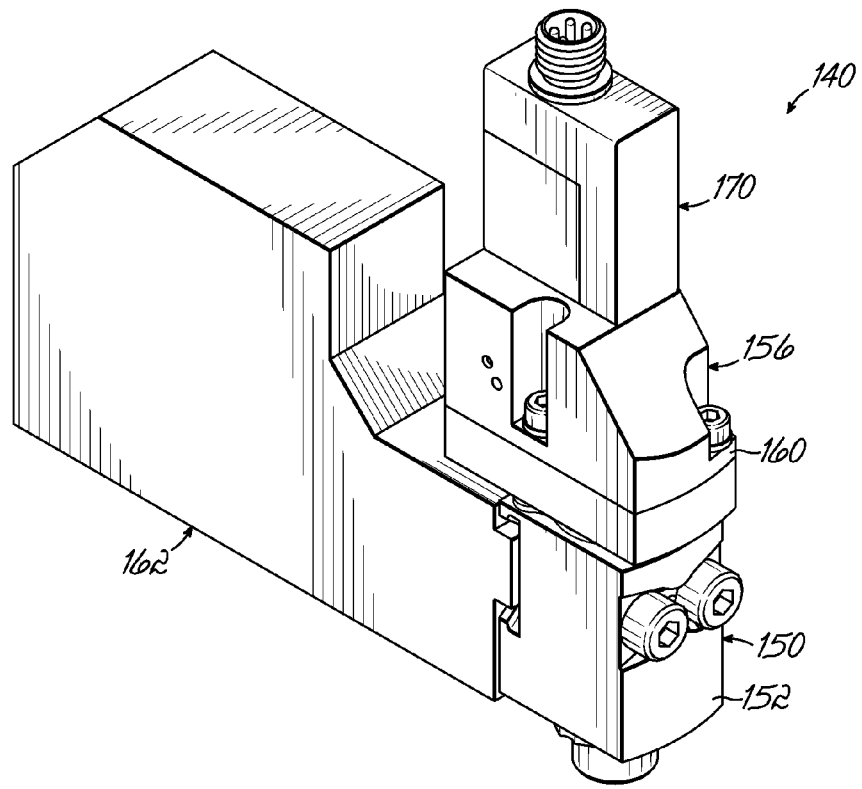
FIG. 5 is a perspective view showing an assembly including an air/adhesive manifold and a liquid dispensing valve constructed in accordance with a second embodiment of the invention.
Figure 6:
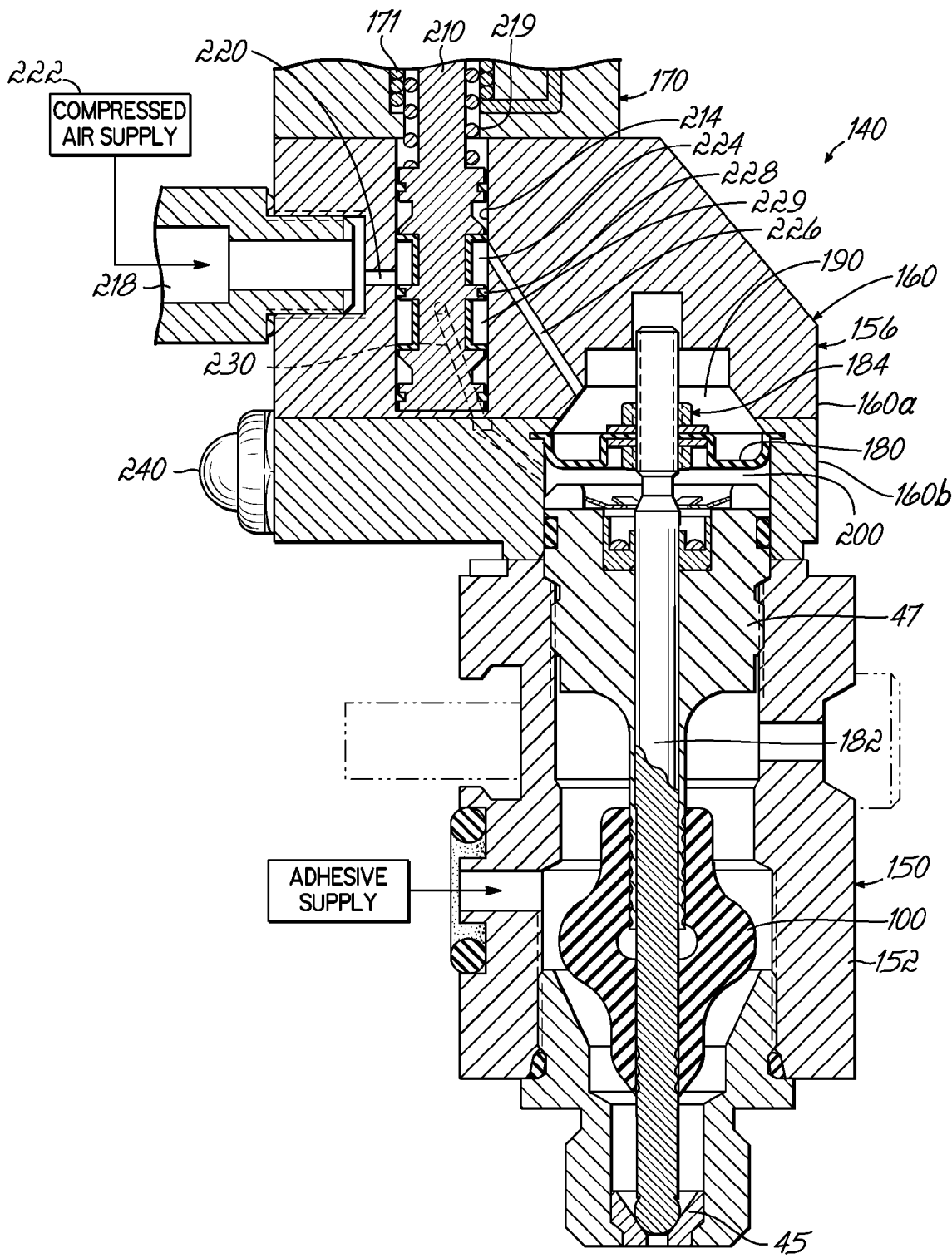
FIG. 6 is a partially fragmented, longitudinal cross sectional view of the liquid dispensing valve of FIG. 5 illustrating the valve in a closed position.
Figure 7:
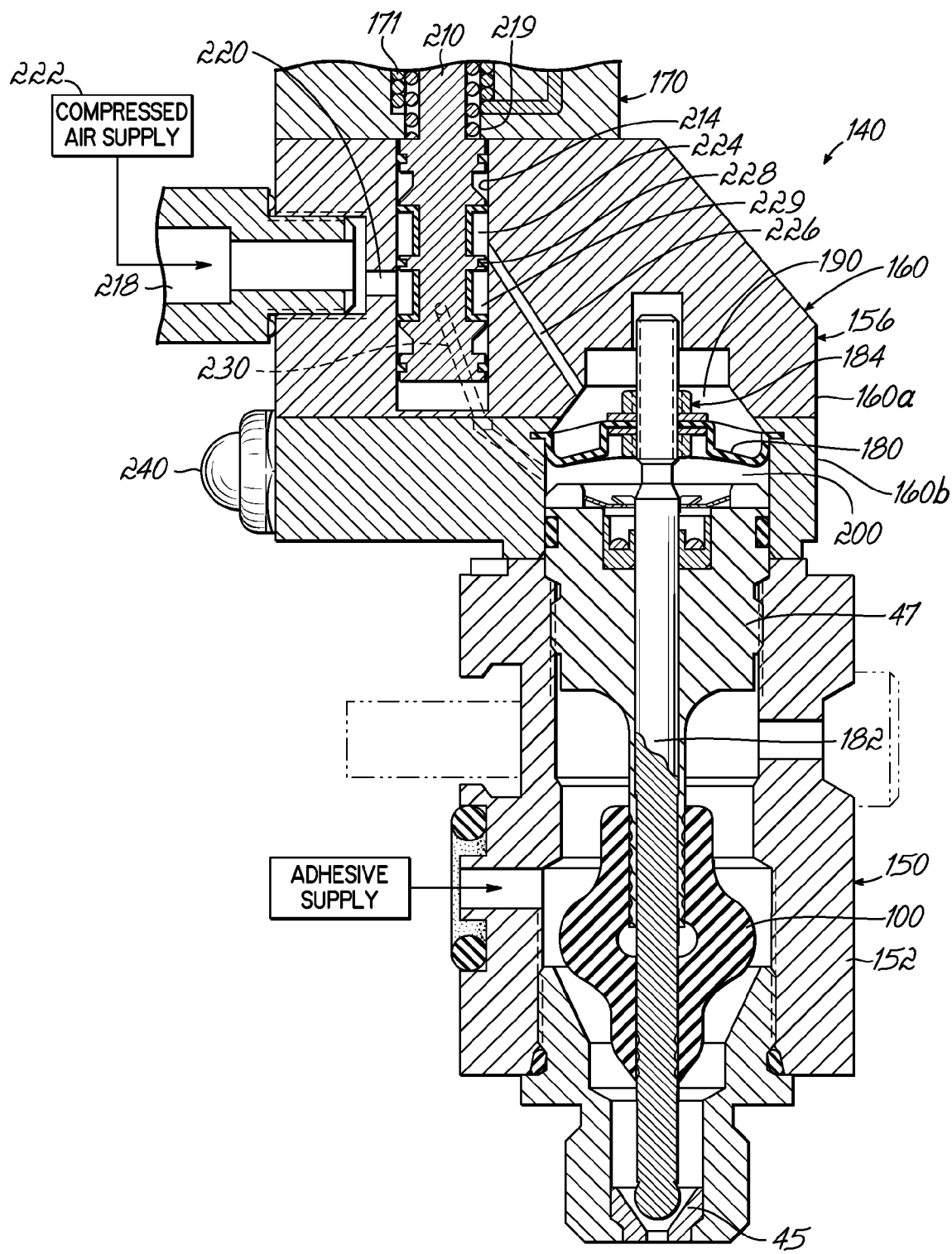
FIG. 7 is a cross sectional view similar to FIG. 6, but illustrating the valve in an open position.

Another embodiment of a dispensing assembly is illustrated in FIGS. 5-7. Like reference numerals in the different embodiments refer to like structure and description. As shown in FIG. 5, this embodiment also includes a liquid dispensing valve 140 having a liquid dispensing portion 150 including a valve body 152, which may be of the same design as the previous embodiment, and an actuation portion 156 including an upper housing or cap 160 comprised of an upper section 160a and a lower section 160b which again may be formed from a thermally insulating, nonmetallic material as previously described. This embodiment likewise includes an air/adhesive manifold 162 as previously described. A solenoid 170 is connected to the upper cap 160.

Referring to FIGS. 6 and 7, this embodiment of the liquid dispensing valve 140 utilizes a diaphragm pneumatic actuator in the form of a diaphragm 180. The diaphragm 180 is rigidly coupled to a valve stem 182 using a suitable fastening assembly 184. When pressurized air is introduced into an upper chamber 190 and against the diaphragm 180, this pushes the diaphragm 180 and attached valve stem 182 to the closed position as shown in FIG. 6. It will be understood that various other actuator designs may be used instead. When pressurized air is instead introduced into the lower chamber 200, this pushes the diaphragm 180 and attached valve stem 182 upward into an open position as shown in FIG. 7. In this embodiment, a movable element or spool 210 of the solenoid 170 is engageable with the valve or module 140. Specifically, spool 210 extends into an air passage 214 of the top cap or housing 160 either partially, as shown, or as previously mentioned, the solenoid components may be completely incorporated into the cap 160. The top cap or housing 160 further comprises a pressurized air inlet 218 and a passage 220 which receive pressurized air from a supply 222 that may be at "shop" pressure of approximately 80 psi.

When the movable element or spool 210 is in a first position shown in FIG. 6, (e.g., when the solenoid coil 171 is not energized and a spring 219 forces the poppet 210 farther into the passage 214), passage 220 communicates pressurized air between the compressed air supply 222 and the upper chamber 190 by way of an annular recess 224 in the spool 210 and a passage 226 in cap 160. A seal 228 on the spool 210 prevents air from being supplied to the lower chamber 200 via a separate passage 230. When the movable element or spool 210 is retracted by energizing the solenoid coil 171 (against the force of the spring 219) the spool 210 moves to a second position aligning passage 220 with a second annular recess 229 of the spool 210. In this position, the second annular recess 229 fluidly couples passage 220 with a passage 230 in the housing 160 which, in turn, leads to lower chamber 200. When the spool 210 is in this second position, the diaphragm assembly 180, 184, and stem 182 are forced by the pressurized air to move to the open position as shown in FIG. 7. When the spool 210 is in the first position shown in FIG. 6, lower chamber 200, passage 230 and the second annular recess 229 communicate with an exhaust passage (not shown) leading to an exhaust silencer 240. Likewise, when the spool 210 is in the second position shown in FIG. 7, upper chamber 190, passage 226, and annular recess 224 communicate with an exhaust passage (not shown) leading to the exhaust silencer 240. Again, this embodiment illustrates the principle of having the movable element 210 of the solenoid 170 at least partially contained within the actuation portion 156, such as at least partially within the upper cap or housing 160 of the liquid dispensing valve 140 thereby enabling a significant reduction in the total pressurized air volume and improving valve actuation speed and performance.

Figure 8A:
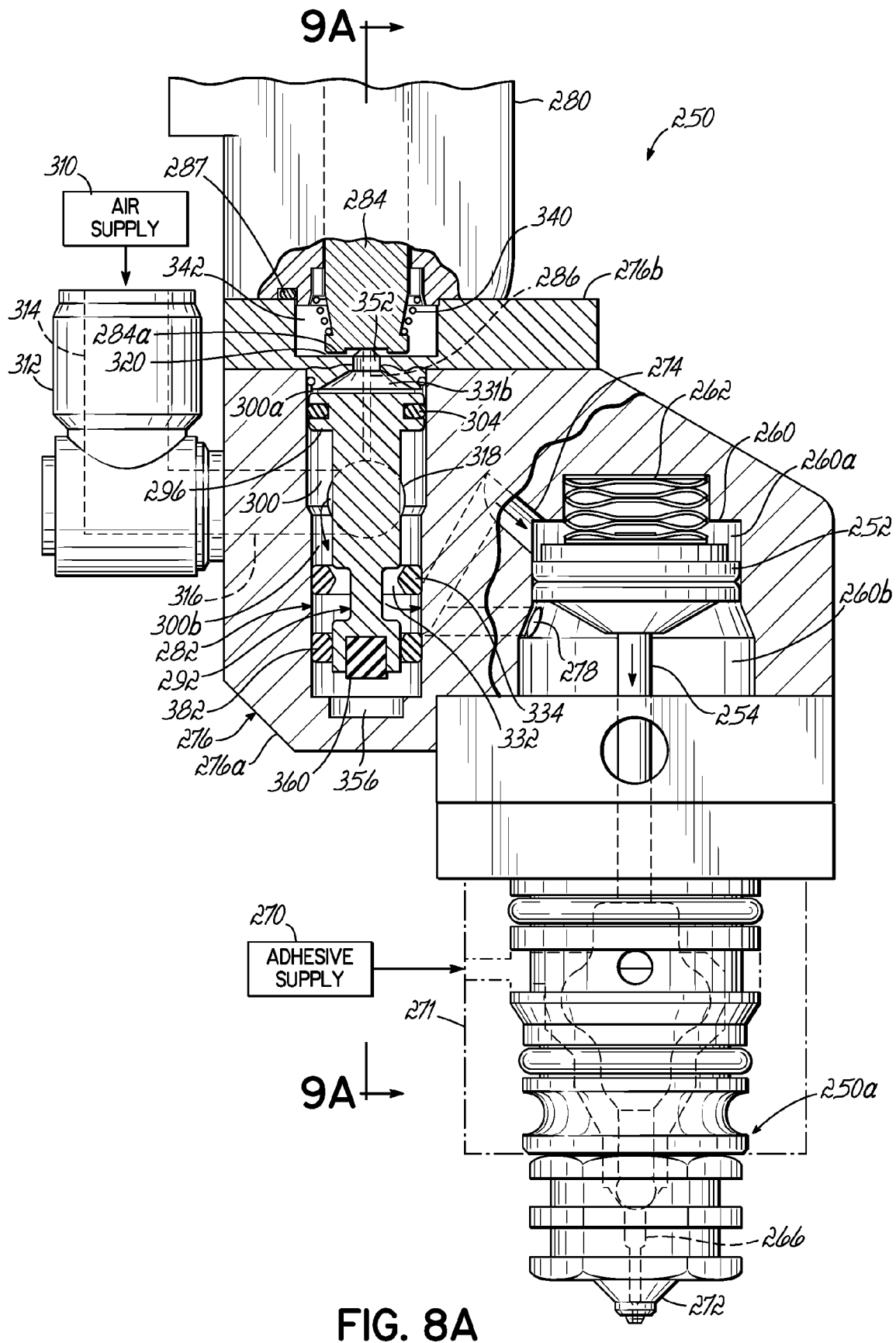
FIG. 8A is a side elevational view, shown partially in cross section, and illustrating another alternative embodiment of a valve in the closed position.
Figure 8B:
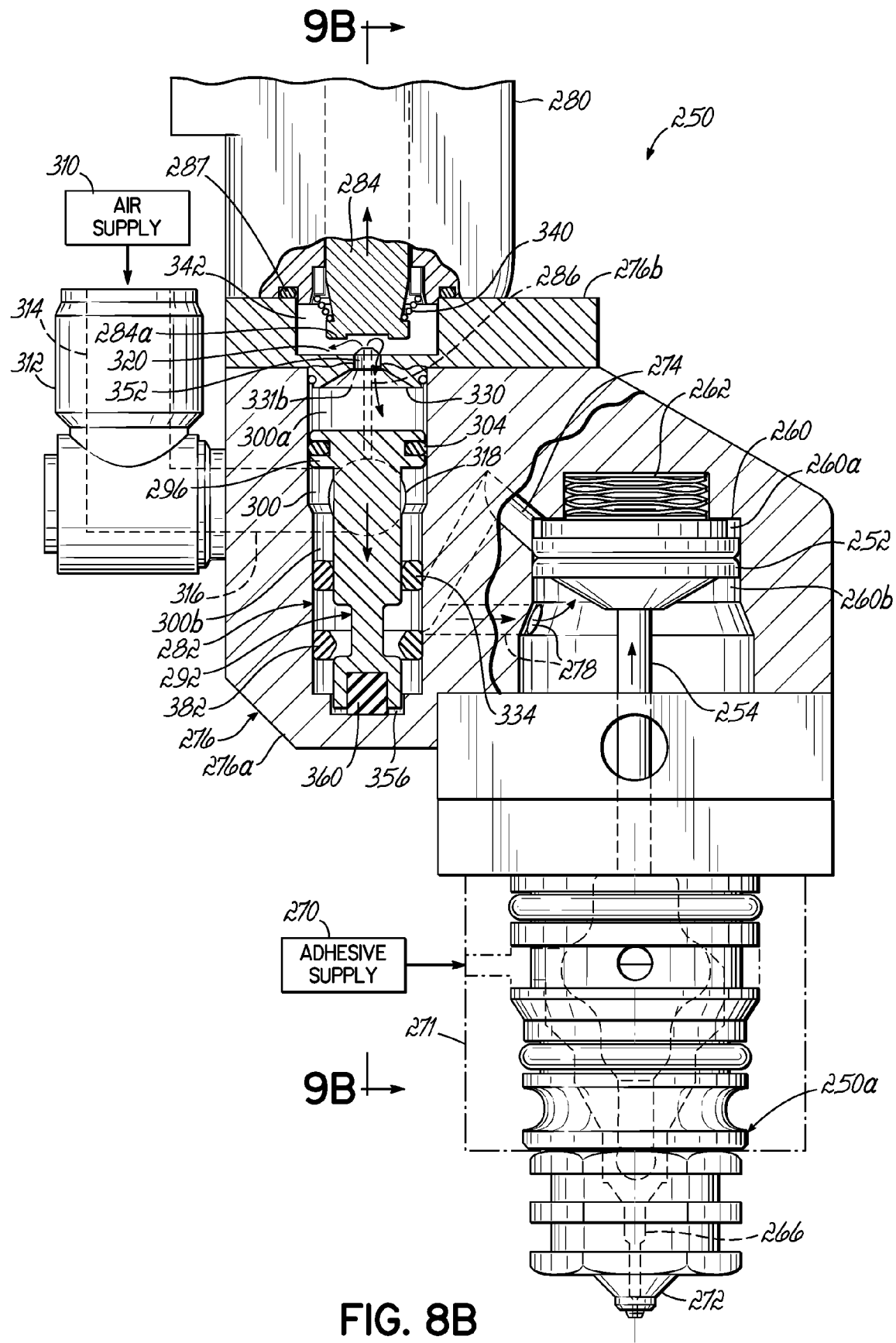
FIG. 8B is a view similar to FIG. 8A, but illustrating the valve in an open position.

Referring now to FIGS. 8A, 8B, 9A and 9B, another embodiment of a liquid dispensing valve 250 is shown and, similar to the first embodiment, utilizes a piston 252 coupled for movement with a valve stem 254 and operable in an air-over-air manner with a spring assist for closing the valve 250. More specifically, the piston 252 is located in a piston chamber 260 having an upper portion 260a and a lower portion 260b. A spring 262 is contained in the upper portion 260a for assisting with closing the valve stem 254 against a valve seat 266. This embodiment does not illustrate details of the lower or dispensing portion 250a of the valve 250 and this portion may be constructed in any suitable manner, such as that previously described. The valve 250 receives liquid such as adhesive from a pressurized supply 270 through a manifold or housing 271 such that, when the valve stem 254 is in the open position as shown in FIG. 8B, liquid is dispensed from a nozzle 272. When pressurized actuation air is directed through a passage 274 in an upper housing or cap 276 of the valve 250 into the upper portion 260a of the piston chamber 260, the piston 252 and attached valve stem 254 will be moved downward to the closed position shown in FIG. 8A, while pressurized air in the lower portion 260b of the piston chamber 260 is exhausted through another passage 278. When pressurized air is instead directed into the lower portion 260b of the piston chamber 260 through the passage 278, the piston 252 and attached valve stem 254 are moved upwardly to the open position shown in FIG. 8B, against the force of the spring 262, as pressurized air in the upper portion 260a of the piston chamber 260 is exhausted through the passage 274. As with all other embodiments, the housing 276 may be formed from a thermally insulating, nonmetallic material such as those previously described. In this embodiment, the housing 276 contains the actuation portion of the valve 250, including the piston 252 and various passages for operation thereof.

Figure 9A:
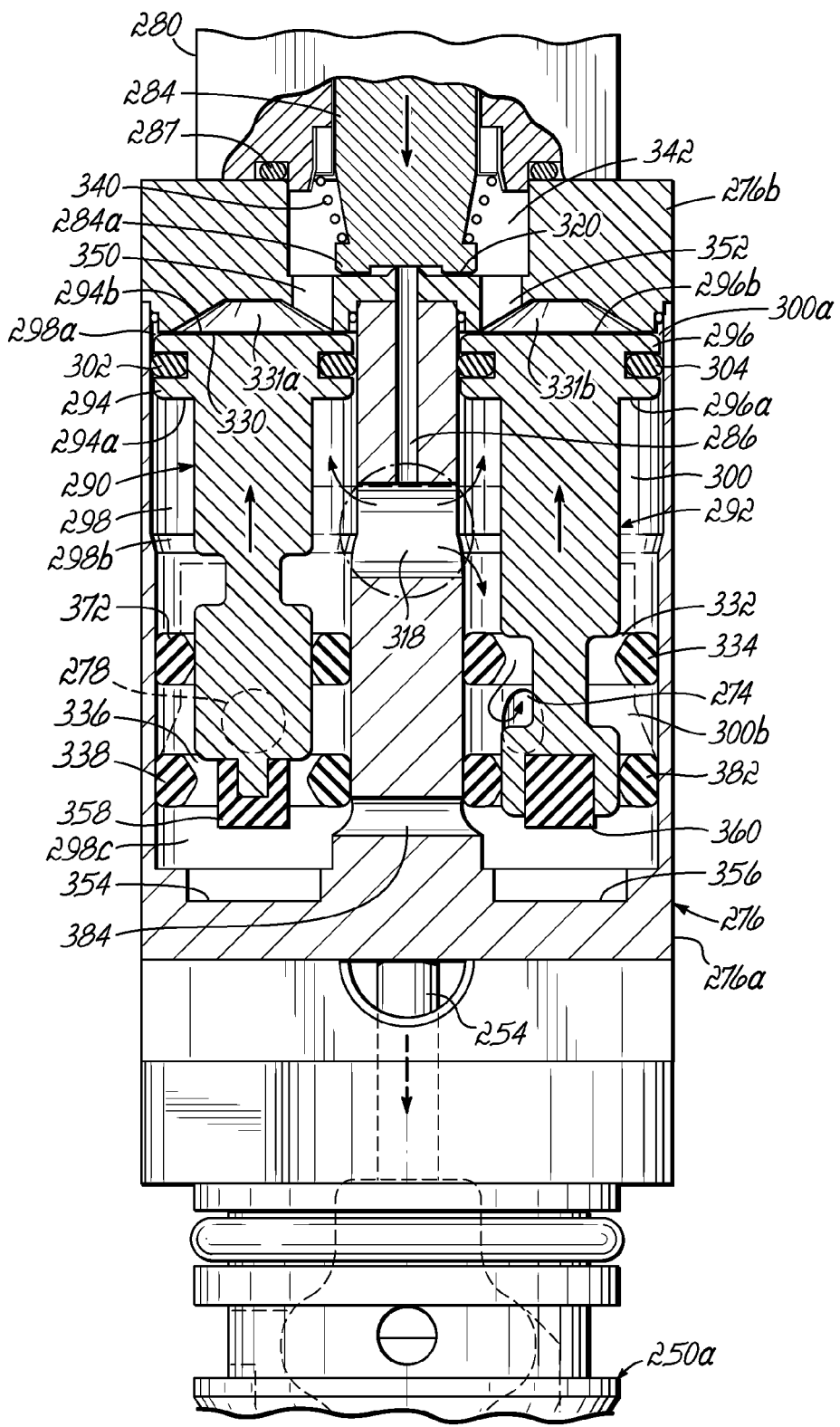
FIG. 9A is a cross sectional view taken along line 9A-9A of FIG. 8A.
Figure 9B:
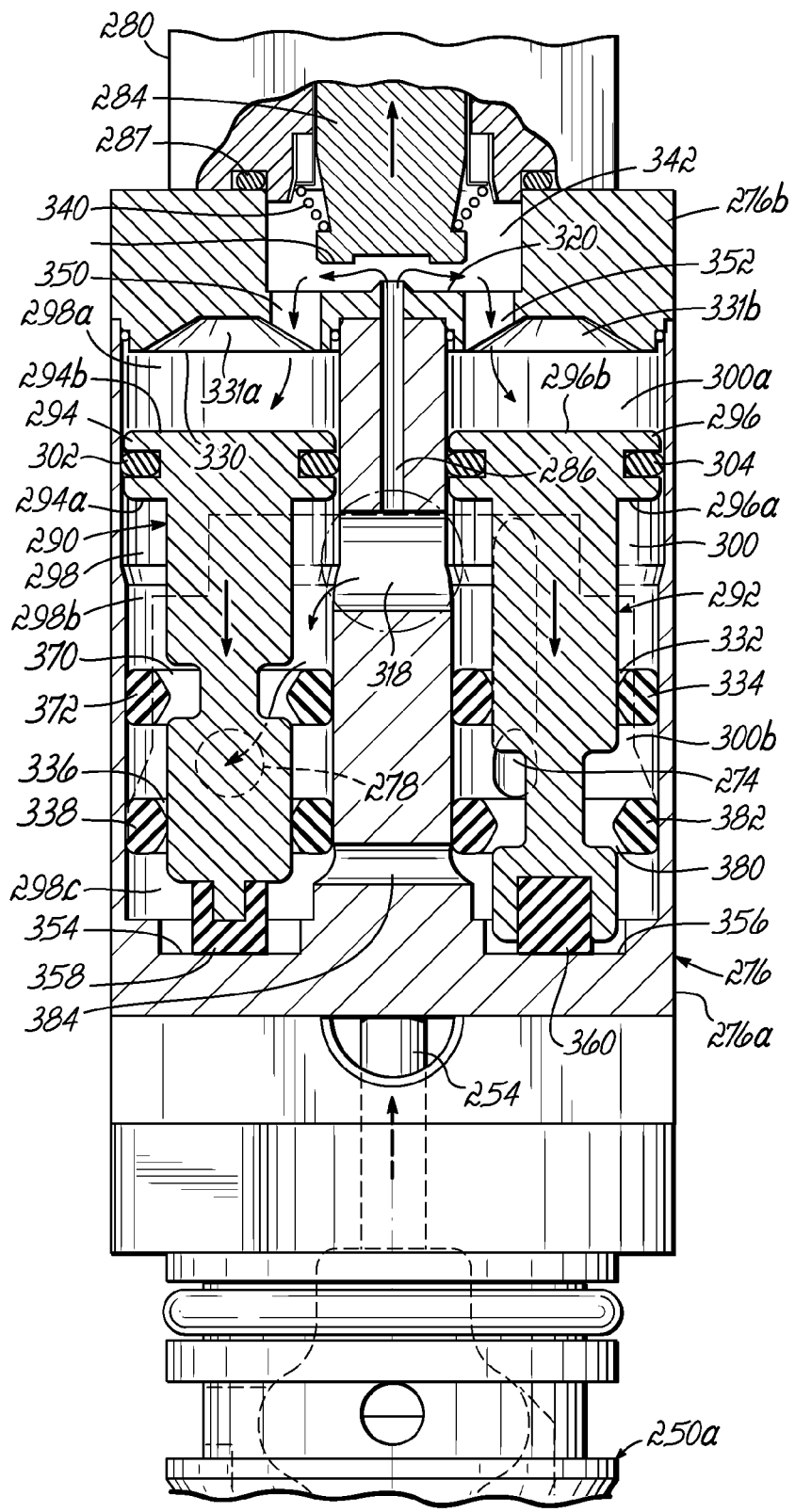
FIG. 9B is a cross sectional view taken along line 9B-9B of FIG. 8B.

For purposes of controlling the positively pressurized (e.g., 80 psi) actuation air as generally described above, an electrically operated solenoid 280 and air valve 282 are provided. Together, solenoid 280 and air valve 282 comprise an actuation air supply device. The solenoid 280 includes a movable element or poppet 284 that selectively opens and closes an air passageway 286 in the housing 276. Solenoid 280 is fastened to the housing 276 by fasteners (not shown) and is sealed thereto by an O-ring 287. Another O-ring 288 seals poppet 284. As best shown in FIGS. 9A and 9B, respective spools 290, 292 in this embodiment have respective upper piston elements 294, 296 located within piston chambers 298, 300 and sealingly engaged with upper portions 298a, 300a of the respective piston chambers 298, 300 by respective dynamic seals 302, 304. A pressurized actuation air supply 310 is in fluid communication with the cap or upper housing 276 through a fitting 312 including a passage 314. An air passage 316 in the body 276a of cap or housing 276 communicates with the passage 314 of the fitting 312. The air passage 316 in the cap 276 also communicates with a transverse air passage 318 as shown best in FIGS. 9A and 9B. The transverse passage 318 communicates with lower portions 298b, 300b of each piston chamber 298, 300. When the poppet 284 of the solenoid 280 is extended as shown in FIGS. 8A and 9A, the end 284a of the poppet 284 will engage a surface 320 which serves as a valve seat. This will close the passage 286 that communicates with the transverse passage 318. Therefore, pressurized air from the air supply 310 will be directed through the passage 314 of fitting 312 and the passage 316 in the cap 276 to the transverse passage 318. The air will be distributed from the transverse passage 318, as shown in FIG. 9A, to the lower portions 298b, 300b of each piston chamber 298, 300. The pressurized air will act against lower surfaces 294a, 296a of the piston elements 294, 296 and simultaneously drive each of the spools 290, 292 upward until they are stopped against an upper internal surface 330 of the top 276b of housing 276. The air will then be directed through a space 332 between the spool 292 and a static seal 334 and into the passage 274 to the upper portion 260a of the piston chamber 260 as shown in FIGS. 8A and 9A. This will drive the piston 252 and the attached valve stem 254 downward to the closed position. As this occurs, air in the lower portion 260b of the piston chamber 260 will be exhausted through passage 278 and into a lowermost portion 298c of piston chamber 298, through a space 336 between spool 290 and a static seal 338 is coupled to an exhaust port (not shown).

When the solenoid poppet 284 is retracted against the force of a spring 340 by energizing the solenoid 280, as previously described, this will open the passage 286 as shown in FIGS. 8B and 9B. Pressurized air will then be directed upward through the passage 286 and into an upper chamber 342 of the cap 276 and then directed downward through respective passages 350, 352 in the top 276b of cap 276 and against the upper surfaces 294b, 296b of each spool piston element 294, 296 in the respective piston chambers 298, 300. To ensure that the pressurized air acts against substantially the entire area of each surface 294b, 296b, cone-shaped recesses 331 are formed in surface 330 and aligned with surfaces 294b, 296b. The recesses 331a, 331b respectively communicate with the passages 350, 352. The pressurized air directed through passages 350, 352, into recesses 331a, 331b will act against surfaces 294b, 296b and simultaneously drive the spools 290, 292 downward as shown in FIGS. 8B and 9B until they stop against lower surfaces 354, 356 of the housing body 276a by engagement of respective Nylon stoppers 358, 360. Spool 290 will seal against static seal 338, preventing air communication between lowermost chamber portion 298c and passage 278. The spool 292 shown on the right in FIG. 9B will seal against the static seal 334 preventing any pressurized air from being directed through the passage 274. Pressurized air will instead be directed through the transverse passage 318 communicating with the chamber 298 on the left shown in FIG. 9B as the air travels in a space 370 between the spool 290 and the static seal 372 and into the air passage 278 communicating with the lower portion 298b of the piston chamber 298 as shown in FIG. 9B. This will drive the piston 252 and attached valve stem 254 upward against the force of the spring 262 to the open position (FIG. 8B). During this upward travel, air in the upper portion 260a of the piston chamber 260 will be exhausted through the upper passage 274 and into lower portion 300b of piston chamber 300. The exhausted air will travel through a space 380 between the spool 292 and a static seal 382, and then through a second transverse passage 384 in the housing body 276a and into lowermost chamber portion 298c. The air will then be exhausted through the exhaust port (not shown) communicating with lowermost chamber portion 298c.

Figure 10:
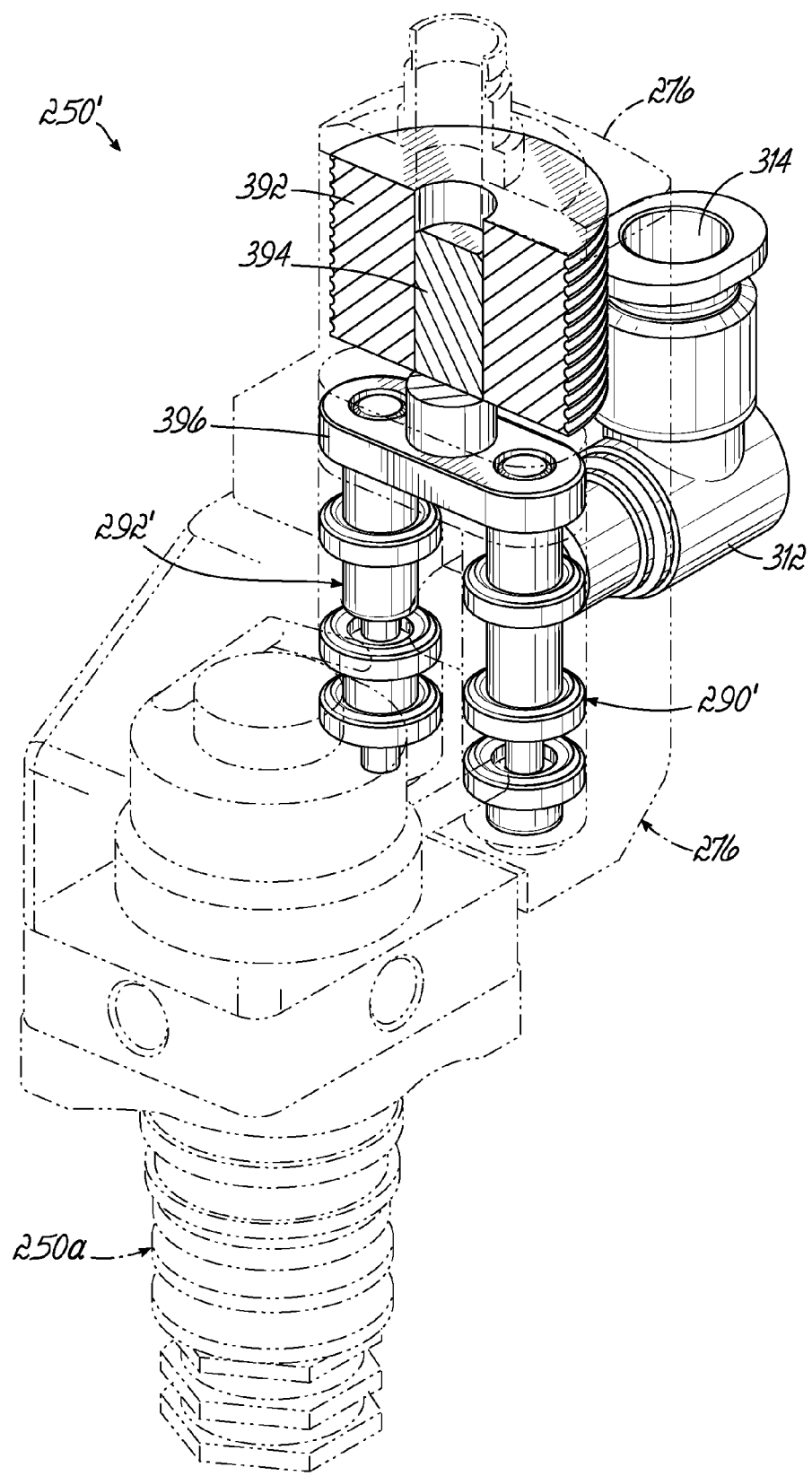
FIG. 10 is a perspective view of a valve illustrating another embodiment.

FIG. 10 illustrates another embodiment of a valve 250' that is similar to the embodiment shown in FIGS. 8A, 8B, 9A and 9B except that a direct connection is made between an electrically operated solenoid 390 and the spools 290, 292. In this regard, a solenoid coil 392 and a movable element or solenoid armature 394 are shown schematically and the solenoid armature 394 is physically connected to the respective spools 290, 292 by a cross member 396. Thus, the simultaneous reciprocating movement of the spools 290, 292 is not pneumatically driven, but is directly driven by the armature 394 of the electrically operated solenoid 390. In all other regards, the design and operation of the spools 290, 292 and the valve 250' are as described above with respect to FIGS. 8A, 8B, 9A and 9B. Thus, like reference numerals are used in FIG. 10 to refer to like elements of structure and like function described in connection with FIGS. 8A, 8B, 9A and 9B. No further description is necessary. It will be appreciated that when the spools 290, 292 are moved to the downward position shown in FIG. 10, the operation of the valve 250' will be as described above with respect to FIGS. 8B and 9B. When the solenoid 390 moves the spools 290, 292 to the upward position (not shown in FIG. 10), the operation of the valve 250' will be as described in connection with FIGS. 8A and 9A. It will further be appreciated that the spool assemblies disclosed in FIGS. 8A, 8B, 9A, 9B and 10 are shown to be vertically oriented. However, these assemblies may instead be oriented in other manners, such as in horizontal orientations.

Figure 11:
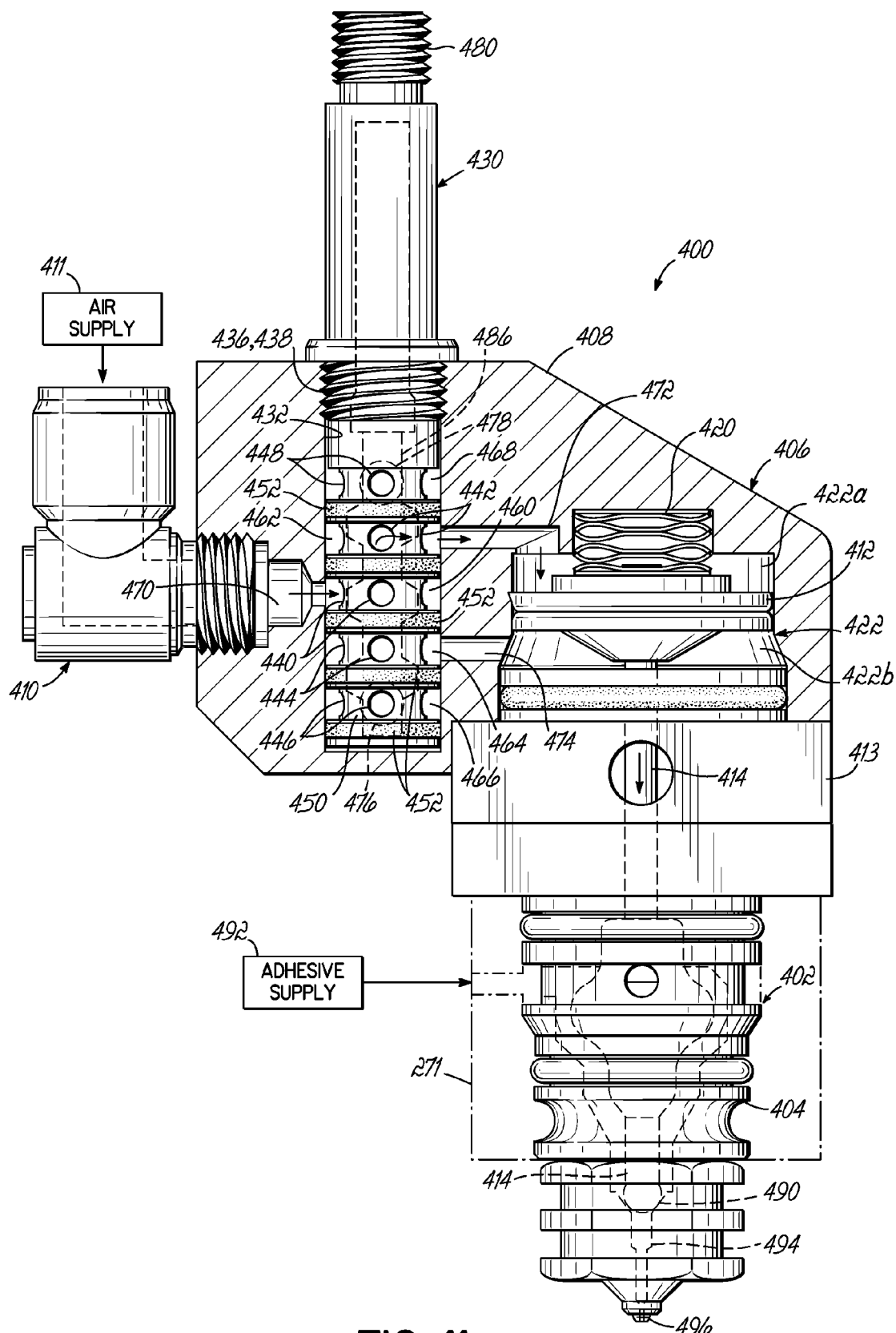
FIG. 11 is a side elevational view, shown partially in cross section, and illustrating another embodiment of a liquid dispensing valve integrating a cartridge style solenoid valve.

FIG. 11 illustrates another embodiment of a liquid dispensing valve 400 further comprises a lower liquid dispensing portion 402 including a valve body 404 and an upper, air actuation portion 406 including a housing or cap 408. The housing or cap 408 is coupled to the valve body 404 in any suitable manner, such as one of those shown and described herein. It will also be understood that the dispensing valve 400 would also be coupled with other system components (not shown), such as a heated manifold and other components necessary for heating and dispensing hot melt adhesive. The housing or cap 408 includes a pressurized air input 410 for receiving air from a supply 411. As previously described, the air may be at conventional "shop" air pressures, for example, of approximately 80 psi. The cap or housing 408 is preferably formed from a thermally insulating material, such as plastic or ceramic or another nonmetallic insulating material (e.g., PPS) as with the other embodiments described herein. As another option or aspect, a thermally insulating member 413, such as a block formed from a nonmetallic, thermally insulating material, may be positioned between the housing 408 and the valve body 404. It will be understood that a thermal isolation feature such as this may be employed in any embodiment between the actuation portion and liquid dispensing portion. The valve body 404 will be inserted into a heated manifold (not shown) for purposes of supplying heated liquid, such as hot melt adhesive, and the manifold will conduct heat to the valve body 404 through direct contact. The liquid dispensing valve 400 further includes a pneumatic actuator, such as a piston 412 affixed to a valve member 414. In this embodiment, the valve member is again a valve stem 414 mounted for movement within the valve body 404. The liquid dispensing portion 402 and actuation portion 406 may be formed in any of the manners previously described, as illustrative examples. A spring 420 is positioned in an upper portion 422a of a piston chamber 422 and engages the piston 412 to provide a closing function for the valve stem 414, generally as described above.

An air supply device, in the form of a cartridge-style, electrically operated solenoid valve 430, is mounted in a blind bore 432 in the upper housing or cap 408. Specifically, the solenoid valve 430 is affixed within the bore 432 by mating threads 436, 438 on the solenoid valve 430 and at the top of the blind bore 432. The connection allows the self-contained solenoid valve 430 to be affixed within and easily removed from the bore 432. The solenoid valve 430 may be any number of cartridge-style, electrically operated solenoid valves such as, for example, any of those available from SMC Corp. of Indianapolis, Ind. or from MAC Valves USA, Inc. of Wixom, Mich. In this example, the solenoid valve is a 5-2 valve in that it has five ports, including one input port 440, two output ports 442, 444, and two exhaust ports 446, 448, and the valve 430 has two positions to switch air between the two output ports 442, 444. The five ports 440, 442, 444, 446, 448 each comprise multiple cross drilled holes in an outer, stationary cylinder 450 of the valve 430, and are separated by five annular seals 452 carried on the cylinder 450. Each port 440, 442, 444, 446, 448 further communicates with a respective annular air space 460, 462, 464, 466, 468 between the cylinder 450 and the blind bore 432. Annular space 460 further communicates with an input air passage 470 in the housing 408 which communicates with the pressurized air input 410. Annular spaces 462, 464 respectively communicate with output air passages 472, 474 leading to the upper and lower portions 422a, 422b of the piston chamber 422. Annular spaces 466, 468 respectively communicate with exhaust passages 476, 478 in the housing 408. The solenoid valve 430 includes an electrical fitting 480 at the top for coupled with electrical power wiring (not shown).

When energized or activated, an armature element which comprises a movable valve component 486 within the cylinder 450 will move from one position to another. In one example, the movement is a reciprocating movement, but it could be other types of movement such as rotational movement. Thus valve component 486 is a reciprocating valve component and cylinder 450 is a stationary valve component. In the position shown in FIG. 11, the solenoid valve 430 is in its "normally closed" position in which an internal spring (not shown) of the valve 430 maintains the movable valve component 486 in a position to define an air path which directs air from the input passage 470, through port 440 to output port 442. The air is directed through annular space 462, passage 472 and into upper portion 422*a* of piston chamber 422 forcing the valve stem 414 into the closed position against a valve seat 490. In this normally closed position, adhesive from a supply 492 is prevented from being dispensed through an outlet passage 494 and a nozzle 496 of the valve 400. At the same time, air from the lower piston chamber portion 422*b* is exhausted through passage 474, annular space 464, ports 444, 446, annular space 466 and exhaust passage 476. When the solenoid valve 430 is energized or activated, this will move the internal movable element 486 to its second position. In the second position, air from the input passage 470 will be directed through port 440 to output port 444 and annular space 464. The air is directed through passage 474 into lower portion 422*b* of piston chamber 422 forcing the valve stem 414 upwardly into the open position against the force of the spring 420 and disengaging the valve stem 414 from the valve seat 490. Adhesive from the supply 492 is dispensed through the nozzle 494 in this open condition (not shown). At the same time, air from the upper piston chamber portion 422*a* is exhausted through passage 472, annular space 462, ports 442, 448, annular space 468 and exhaust passage 478.

While various embodiments of liquid dispensing valves have been disclosed herein in preferred forms, it will be appreciated that any number of valve configurations and dispensing valve body designs may be utilized in combination with the inventive aspects. For example, the dispensing valve may have single piece or multi-piece body configurations in which the air actuation and liquid dispensing portions are in a single housing or body, or in separated housings or bodies as shown and described herein. The liquid dispensing valves or modules may be configured in different manners such as face mounted designs or cartridge/insert type designs as shown herein, or still other configurations.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features discussed herein may be used alone or in any combination depending on the needs and preferences of the user. This has been a description of illustrative aspects and embodiments the present invention, along with the preferred methods of practicing the present invention as currently known. However, the invention itself should only be defined by the appended claims.

What is claimed is:

1. An adhesive dispensing valve, comprising:
    an adhesive dispensing portion including an adhesive inlet for receiving the adhesive and an adhesive outlet for discharging the adhesive, a valve member extending along a longitudinal axis and mounted for movement relative to said adhesive outlet between open and closed positions, and an adhesive passage communicating between said adhesive inlet and said adhesive outlet;
    an actuation portion comprising a housing and with an air inlet for receiving air from a source of pressurized air;
    at least one air passageway coupled with said air inlet;
    a pneumatic actuator fixed to the housing, the pneumatic actuator operated by positively pressurized air flowing within said air passageway to move said valve member at least to the open position, said pneumatic actuator being coupled to said valve member along the longitudinal axis such that said pneumatic actuator moves along the longitudinal axis with said valve member; and
    an electrically operated air supply device interacting with said at least one air passageway to control the flow of pressurized air from the source of pressurized air to said pneumatic actuator, said air supply device comprising a first air chamber coupled with a first air passageway, a second air chamber coupled to a second air passageway, a first spool reciprocately mounted within the first air chamber, and a second spool reciprocately mounted within the second air chamber,
    wherein the pressurized air reciprocates said first and second spools between first and second positions such that, in the first position, said first spool prevents the pressurized air from flowing through said first air chamber, and in the second position, said second spool prevents the pressurized air from flowing through said second air chamber.

2. The adhesive dispensing valve of claim 1, wherein said actuation portion is formed from a thermally insulating, nonmetallic material.

3. The adhesive dispensing valve of claim 1, wherein said air supply device further comprises a movable element engageable with said actuation portion and movable with respect to said air inlet to selectively allow and prevent flow of the pressurized air to operate said pneumatic actuator.

4. The adhesive dispensing valve of claim 1, wherein said air supply device further comprises an electrically operated solenoid including a movable element.

5. The adhesive dispensing valve of claim 4, further comprising an insulating member to insulate said solenoid from the adhesive.

6. The adhesive dispensing valve of claim 4, wherein said solenoid further comprises a cartridge-style solenoid valve.

7. The adhesive dispensing valve of claim 4, wherein said movable element of said air supply device interacts with said air inlet.

8. The adhesive dispensing valve of claim 1, wherein said air supply device is mounted to said housing, said air supply device further comprising a movable element extending from outside said housing at least partially into said housing.

9. The adhesive dispensing valve of claim 1, wherein the first air passageway is configured to supply pressurized air to said pneumatic actuator to move said valve member to the closed position, and wherein the second air passageway is configured to supply pressurized air to said pneumatic actuator to move said valve member to the open position, and wherein said air supply device further includes a movable element having an air connection passage, said air connection passage communicating with said first air passageway when said movable element is in a first position, and said air connection passage communicating with said second air passageway when said movable element is in a second position.

10. The adhesive dispensing valve of claim 1, wherein said air supply device further comprises a housing that defines the first air chamber and the second air chamber, and said air supply device further comprises a movable element for controlling pressurized air flow to said first and second spools, and wherein the pressurized air reciprocates said spools between the first and second positions, said first position directing pressurized air to said pneumatic actuator to move the valve member to the closed position and said second position directing pressurized air to said pneumatic actuator to move the valve member to the open position.

11. The adhesive dispensing valve of claim 10, wherein said air supply device further comprises an electrically operated solenoid, said electrically operated solenoid comprising said movable element, and said first and second spools further comprising pneumatic pistons, said movable element selectively controlling pressurized air delivery to said pneumatic pistons.

12. The adhesive dispensing valve of claim 1, wherein said air supply device further comprises an electrically operated solenoid having a movable element, wherein said movable element is physically connected to at least one spool configured to control flow of the pressurized air to said pneumatic actuator.

13. The adhesive dispensing valve of claim 1, wherein said air supply device is thermally insulated from said adhesive dispensing portion.

14. The adhesive dispensing valve of claim 1, further comprising a valve seat in fluid communication with said at least one air passageway, said air supply device further including a movable element selectively engageable with said valve seat to control the flow of air through said at least one air passageway to said pneumatic actuator.

15. The adhesive dispensing valve of claim 1, wherein said air supply device further comprises an electrically operated solenoid valve, said electrically operated solenoid valve configured to selectively control introduction of the positively pressurized air to the first and second air passageways.

16. The adhesive dispensing valve of claim 1, wherein said actuation portion includes a chamber, and said pneumatic actuator divides said chamber into a first chamber portion containing a spring for biasing said pneumatic actuator towards the closed position and a second chamber portion selectively receiving pressurized air from said air passageway.

17. The adhesive dispensing valve of claim 1, wherein said pneumatic actuator further comprises a movable diaphragm.

18. An adhesive dispensing valve, comprising:
a housing having an air inlet for receiving pressurized air, an adhesive inlet for receiving the adhesive, and an adhesive outlet for discharging the adhesive;
a valve member disposed within said housing for moving from an open position, for allowing the adhesive to discharge from said adhesive outlet, to a closed position, for terminating the discharge of adhesive from said adhesive outlet;
a pneumatic actuation element disposed within said housing and connected to said valve member for moving said valve member at least from the closed position to the open position;

at least one air passageway disposed within said housing and extending at least partially between said air inlet and said pneumatic actuation element;
an electrically operated air supply device interacting with said at least one air passageway to control the flow of pressurized air to said pneumatic actuation element, said air supply device comprising a first air chamber coupled with a first air passageway, a second air chamber coupled to a second air passageway, a first spool reciprocately mounted within the first air chamber, and a second spool reciprocately mounted within the second air chamber,
wherein the pressurized air reciprocates said first and second spools between first and second positions such that in the first position said first spool prevents the pressurized air from flowing through said first air chamber, and in the second position, said second spool prevents the pressurized air from flowing through said second air chamber; and
an actuator configured to allow the pressurized air to flow into said air supply device, such that when said actuator is in a closed position, flow of the pressurized air is terminated at a location within said housing.

19. The adhesive dispensing valve of claim 18, wherein said actuator is electrically operated.

20. The adhesive dispensing valve of claim 19, wherein said actuator is a solenoid.

21. The adhesive dispensing valve of claim 20, further comprising an insulating member to insulate said solenoid from the adhesive.

22. The adhesive dispensing valve of claim 18, wherein said pneumatic actuation element moves within a chamber communicating with a terminal end of said at least one air passageway, and wherein said housing further includes an actuation housing portion defined by a unitary housing member having said air inlet, said chamber, said at least one air passageway, and the location where the flow of pressurized air is terminated when said actuator is in the closed position.

23. The adhesive dispensing valve of claim 22, wherein said actuation housing portion is formed from a thermally insulating, nonmetallic material.

24. An adhesive dispensing valve, comprising:
a housing having an air inlet for receiving pressurized air, an adhesive inlet for receiving the adhesive, and an adhesive outlet for discharging the adhesive;
a valve member disposed within said housing for moving from an open position, for allowing the adhesive to discharge from said adhesive outlet, to a closed position, for terminating the discharge of adhesive from said adhesive outlet;
a pneumatic actuation element disposed within said housing and connected to said valve member for moving said valve member at least from the closed position to the open position;
an air passageway disposed within said housing and extending between said air inlet and said pneumatic actuation element; and
an actuator having at least a portion mounted for movement within said air passageway, and for moving from a closed position to an open position for allowing the pressurized air to flow to said pneumatic actuation element, such that when said actuator is in the closed position, flow of the pressurized air is terminated at a location within said housing,
wherein said housing further includes an actuation housing portion defined by a unitary housing member having said air passageway and a valve seat in said air passageway in close proximity to said pneumatic actuation element, said actuator interacting with said valve seat to define the open and closed positions, such that when said actuator moves from the closed position to the open position, the flow of the pressurized air is already within said actuation housing portion in close proximity to said pneumatic actuation element and quickly pressurizes said pneumatic actuation element to move said valve member; and wherein said actuation housing portion is formed from a thermally insulating, nonmetallic material.

25. The adhesive dispensing valve of claim 24, wherein said housing contains first and second spools each mounted for reciprocating movement, and said actuator further comprises a movable element for controlling pressurized air flow to said spools, and wherein the pressurized air reciprocates said spools between the first and second positions, said first position directing pressurized air to said pneumatic actuation element to move said valve member to the closed position and said second position directing pressurized air to said pneumatic actuation element to move said valve member to the open position.

26. The adhesive dispensing valve of claim 24, wherein said housing includes a chamber, and said pneumatic actuation element divides said chamber into a first chamber portion containing a spring for biasing said pneumatic actuation element towards the closed position and a second chamber portion selectively receiving pressurized air from said air passageway.

27. The adhesive dispensing valve of claim 24, wherein said pneumatic actuation element further comprises a movable diaphragm.

28. An adhesive dispensing valve, comprising:
an adhesive dispensing portion including an inlet for receiving the adhesive and an outlet for discharging the adhesive, a valve member extending along a longitudinal axis and mounted for movement relative to said outlet between open and closed positions, and an adhesive passage communicating between said inlet and said outlet;
an actuation portion including a housing with at least one air passageway, said housing further containing a pneumatic actuator having a first and second surface configured to be exposed to pressurized air and each of the first and second surfaces having a different diameter, the pneumatic actuator operated by positively pressurized air flowing within said at least one air passageway to move said valve member at least to the open position, said pneumatic actuator being coupled to said valve member along the longitudinal axis such that said pneumatic actuator moves along the longitudinal axis with said valve member;
an air supply device interacting with said at least one air passageway to control the flow of pressurized air to said pneumatic actuator, said air supply device comprising a first air chamber coupled with a first air passageway, a second air chamber coupled to a second air passageway, a first spool reciprocately mounted within the first air chamber, and a second spool reciprocately mounted within the second air chamber,
wherein the pressurized air reciprocates said first and second spools between first and second positions such that, in the first position, said first spool prevents the pressurized air from flowing through said first air chamber, and in the second position said second spool prevents the pressurized air from flowing through said second air chamber; and
an electrically operated solenoid valve including an air inlet adapted to be coupled with a source of the positively pressurized air, and at least one air outlet communicating with said air inlet, said air outlet positioned within said housing and communicating said at least one air passageway via the air supply device to direct the positively pressurized air to said at least one air passageway.

29. The adhesive dispensing valve of claim 28, wherein said housing is formed from a thermally insulating, nonmetallic material.

30. The adhesive dispensing valve of claim 28, wherein said electrically operated solenoid valve is thermally insulated from said adhesive dispensing portion.

31. The adhesive dispensing valve of claim 28, wherein said pneumatic actuator further comprises a movable diaphragm.

32. An adhesive dispensing valve, comprising:
an adhesive dispensing portion including an inlet for receiving the adhesive and an outlet for discharging the adhesive, a valve member extending along a longitudinal axis and mounted for movement relative to said outlet between open and closed positions, and an adhesive passage communicating between said inlet and said outlet;
an actuation portion including a housing with at least one air passageway, said housing formed from a thermally insulating, nonmetallic material and further containing a pneumatic actuator having a first and second surface configured to be exposed to pressurized air and each of the first and second surfaces having a different diameter, the pneumatic actuator operated by positively pressurized air flowing within said at least one air passageway to move said valve member at least to the open position, said pneumatic actuator being coupled to said valve member along the longitudinal axis such that said pneumatic actuator moves along the longitudinal axis with said valve member;
an air supply device interacting with said at least one air passageway to control the flow of pressurized air to said pneumatic actuator, said air supply device comprising a first air chamber coupled with a first air passageway, a second air chamber coupled to a second air passageway, a first spool reciprocately mounted within the first air chamber, and a second spool reciprocately mounted within the second air chamber,
wherein the pressurized air reciprocates said spools between first and second positions such that, in the first position, said first spool prevents the pressurized air from flowing through said first air chamber, and in the second position, said second spool prevents the pressurized air from flowing through said second air chamber; and
an electrically operated solenoid coupled to said housing and operative to selectively control introduction of the positively pressurized air to the air supply device.

33. An adhesive dispensing valve, comprising:
an adhesive dispensing portion including an inlet for receiving the adhesive and an outlet for discharging the adhesive, a valve member extending along a longitudinal axis and mounted for movement relative to said outlet between open and closed positions, and an adhesive passage communicating between said inlet and said outlet;

an actuation portion including a housing with an air passageway, said housing formed from a thermally insulating, nonmetallic material and further containing a pneumatic actuator operated by positively pressurized air flowing within said air passageway to move said valve member at least to the open position, said pneumatic actuator being coupled to said valve member along the longitudinal axis such that said pneumatic actuator moves along the longitudinal axis with said valve member; and an electrically operated solenoid coupled to said housing and operative to selectively control introduction of the positively pressurized air to the air passageway, wherein said electrically operated solenoid further comprises a movable element positioned at least partially within said housing and operative to selectively control introduction of the positively pressurized air to the air passageway.

34. The adhesive dispensing valve of claim 33, wherein said pneumatic actuator further comprises a movable diaphragm.

35. An adhesive dispensing valve, comprising:

an adhesive dispensing portion including an inlet for receiving the adhesive and an outlet for discharging the adhesive, a valve member extending along a longitudinal axis and mounted for movement relative to said outlet between open and closed positions, and an adhesive passage communicating between said inlet and said outlet;

an actuation portion including a housing with at least one air passageway, said housing further containing a pneumatic actuator fixed to the housing, the pneumatic actuator operated by positively pressurized air flowing within said at least one air passageway to move said valve member at least to the open position, said pneumatic actuator being coupled to said valve member along the longitudinal axis such that said pneumatic actuator moves along the longitudinal axis with said valve member, said housing defining a first air chamber and a second air chamber, the first air chamber being coupled to a first air passageway, and the second air chamber being coupled to a second air passageway;

an electrically operated solenoid coupled to said housing and including a movable element extending into said housing;

a first spool reciprocately mounted within the first air chamber; and a second spool reciprocately mounted within the second air chamber, wherein the first and second spool are operatively coupled to the movable element such that movement of said movable element controls movement of said spools between first and second positions such that, in the first position, said first spool prevents the pressurized air from flowing through said first air chamber, and in the second position, said second spool prevents the pressurized air from flowing through said second air chamber.

36. The adhesive dispensing valve of claim 35, wherein movement of said movable element controls simultaneous movement of said first and second spools between respective first and second positions, said first position directing pressurized air to said pneumatic actuator to move said valve member to the open position and said second position directing pressurized air to said pneumatic actuator to move said valve member to the closed position.

37. The adhesive dispensing valve of claim 35, wherein said first spool is physically connected for movement with said movable element.

38. The adhesive dispensing valve of claim 35, wherein said first spool further comprises a pneumatic piston, and said movable element selectively controls a flow of pressurized air to said pneumatic piston thereby controlling movement of said first spool between said first and second positions.

39. The adhesive dispensing valve of claim 35, wherein said electrically operated solenoid is thermally insulated from said adhesive dispensing portion.

40. The adhesive dispensing valve of claim 35, wherein said pneumatic actuator further comprises a movable diaphragm.

* * * * *